US008338633B2

(12) United States Patent
Kiviranta (10) Patent No.: US 8,338,633 B2
(45) Date of Patent: Dec. 25, 2012

(54) METHOD OF PROCESSING TALL OIL (75) Inventor: Esko Kiviranta, Rauma (FI)

(73) Assignee: Forchem Oy, Rauma (FI)

( * ) Notice: Subject to any disclaimer, the term of this patent is extended or adjusted under 35 U.S.C. 154(b) by 376 days.

(21) Appl. No.: 12/600,039

(22) PCT Filed: May 15, 2008

(86) PCT No.: PCT/FI2008/050275
§ 371 (c)(1),
(2), (4) Date: Nov. 13, 2009

(87) PCT Pub. No.: WO2008/139041
PCT Pub. Date: Nov. 20, 2008

(65) Prior Publication Data
US 2010/0152478 A1  Jun. 17, 2010

(30) Foreign Application Priority Data
May 15, 2007  (FI) ...................................... 20070381

(51) Int. Cl.
*C07C 69/00*  (2006.01)
(52) U.S. Cl. ...................................................... 560/129
(58) Field of Classification Search .................. 560/129
See application file for complete search history.

(56) References Cited

U.S. PATENT DOCUMENTS
| 4,536,333 A | 8/1985 | Olechowski |
| 6,348,566 B1 | 2/2002 | Sarasto |
| 2005/0010061 A1 | 1/2005 | Hamunen |

FOREIGN PATENT DOCUMENTS
| EP | 1291355 A | 3/2003 |
| EP | 1637582 A1 | 3/2006 |
| FI | 105569 B | 6/1999 |
| WO | 9634932 A1 | 11/1996 |
| WO | 99/29813 A | 6/1999 |
| WO | WO 9929813 A1 * | 6/1999 |
| WO | 2004074415 A1 | 9/2004 |

OTHER PUBLICATIONS

Vikstrom F et al, "Sterols and Triterpenyl alcohols in common pulpwoods and black liquor soaps", Holz als Roh-und Werkstoff, European Journal of Wood and Wood Products, Aug. 1, 2008, vol. 63, No. 4, Springer, Berlin, DE.
Xu, W-L et al, "Study on the esterification kinetics of phytosterols with excess acetic acid under reflux conditions", Journal of Chemical Engineering of Chinese Universities, 2005, vol. 19, No. 3.
J-J Matthijssen, International Search Report for PCT/FI2008/050275, Sep. 30, 2008.
Auli Rainio, Search report for FI 20070381, Dec. 17, 2007.

* cited by examiner

*Primary Examiner* — Deborah D Carr
(74) *Attorney, Agent, or Firm* — Chernoff Vilhauer McClung Stenzel LLP (57) ABSTRACT A method of processing wood oil which is generated during pulping. In the method, low molecular weight carboxyl acid that is approximately 0.5-5.0% of the wood oil quantity (weight) is added to that wood oil early in its separation stage, in order to esterify the alcohol groups present in the wood oil, by the said acid. The protective esterification according to the present invention prevents the esterification of the alcohol groups by the fatty acids naturally present in the wood oil.

19 Claims, 7 Drawing Sheets

METHOD OF PROCESSING TALL OIL

This is a national stage application filed under 35 USC 371 based on International Application No. PCT/FI2008/050275 filed May 15, 2008 and claims priority under 35 USC 119 of Finnish Patent Application No. FI 20070381 filed May 15, 2007.

The present invention relates to a method of processing wood oil.

Products comprising wood oil, for instance fatty acids, resin acids and neutral compounds are released after pulping, when the soap is separated from the waste liquor and thereafter processed with acids. The concept of wood oil embraces softwood oil, hardwood oil and mixtures thereof. Generally, softwood oil is tall oil (Crude Tall Oil, CTO), which term will be used hereinafter, but without this term in any way limiting the present invention to this wood oil product.

The fatty oils are the valuable part of the tall oil products. Crude tall oil comprises mainly the following components: resin acids, fatty acids and neutral compounds, i.e. the unsaponifiable agents. The saponifiable agents, in turn, are alcohols and sterols, which are later esterified by, among others, the fatty acids. In totally fresh crude tall oil, there are free original alcohols and sterols, typically approximately 25%, but their quantity decreases under typical conditions of tall oil processing in such a way that the acid number of the fatty acids decreases by approximately 0.2 units/24 hours/60° C., because they are continuously esterified by the sterols and the fatty alcohols. Naturally, it is possible to break up these esters by using an alkali treatment, but this is slow. Typically, the above-mentioned process continues to the point where all remaining free sterols and alcohols together make up only 15% of the initial 25 percent of the CTO amount. When splitting the soap which is in the crude tall oil (separation of tall oil from black liquor residues) the soap is treated with acid, generally sulphuric acid, which is a catalyst that greatly accelerates the process of esterification.

The purpose of the present invention is to provide a new solution for improving the yield of fatty acids and facilitating further processing of sterols.

According to the present invention, a protective esterification of the wood oil is carried out by using small molecular (short-chained) dicarboxylic acids, such as lower alkane acid or a mixture of several alkane acids.

It has been discovered that preventing esterification of the acids of wood oils improves not only the yield of the fatty acids in the distillation process, but the yield of the sterols, too, and facilitates the further separation of the sterols, in cases where sterols are separated from the tall oil.

Earlier, certain publications have directly or indirectly expressed how esterification of fatty acids takes place in conditions of storage (Al Wong, April 2003, Forest Chemicals Review, pp. 12-17). Generally, on the one hand crude tall oil must be stored at temperatures above 50° C. in order to prevent crystallization, but, on the other hand, at temperatures above 50° C., the acid number starts to decrease rapidly, i.e. esterification of the fatty acids takes place by, among others, the sterols. Typically, the percentage of the sterols in crude tall oil is approximately 3-5%. Polyhydroxy alcohols have been used for esterification of tall oil, in order to improve the separation of resins and fatty acids. In this study (L. H. Dunlab, JAOCS, 1950 (27), 361-366), clay treated with acid was used as a catalyst, and typically glycerine for esterification of the acids.

Esterification of sterols by low molecular weight carboxylic acids has not been reported in the literature or in earlier patents.

According to the present invention, a low molecular weight (i.e. a lower) carboxyl acid is added to wood oil in an amount of approximately 0.5-5.0% of the wood oil quantity (weight) in order to esterify at least a significant part, in practice essentially all, of the alcohol groups which are present in the wood oil. The esterification step is carried out in order essentially to prevent esterification of said alcohol groups by fatty acids naturally contained in the wood oil.

Considerable advantages are achieved with the invention. Thus, the distillation of the fatty acids of the crude wood oil and the separation of the sterols are substantially improved. It is possible to utilize this in the processing of wood oil, and further processing.

Furthermore, it has been found that during the esterification, a small molecular organic acid itself acts as a catalyst for the esterification and, as a result, the esterification advances well.

Pursuant to the present invention, an essentially non-aqueous wood oil fraction is treated with a lower carboxylic acid to provide protective esterification of alcoholic compounds (hydroxyl compounds) in order to prevent esterification of said compounds with the fatty acids or resin acids of the wood oil which would turn the valuable hydroxyl and carboxylic compounds into a practically useless ester.

In the following, the present invention and the advantages achieved will be examined more closely with the help of a detailed explanation and the accompanying drawings.

As discussed above, according to the present invention, to wood oil obtained from pulping, a low molecular weight (lower) carboxylic acid is added in an amount of approximately 0.5 to 5.0%, preferably about 1 to 3%, of the wood oil quantity (weight) in order to esterify the compounds in the wood oil which contain alcoholic groups, whereby this esterification will prevent an esterification reaction between the compounds and acids naturally contained in the wood oil. The lower carboxylic acid typically has 1 to 6, in particular 1 to 4, preferably 1 to 3 carbon atoms.

Wood oil is generally obtained from the spent liquor of the kraft process used for pulping of a fibrous raw-material, typically a cellulosic or lignocellulosic raw-material. Usually, the spent liquor of the pulping process is treated with an acid in order to release the wood oil components from their corresponding sodium salts. EP Patent No. 1 037 958 discloses a method for enhancing the cooking step in a tall oil preparation process comprising a neutralisation step, in which the soap is neutralised to form soap oil, and a cooking step, in which the soap oil is cooked with sulphuric acid to form tall oil, wherein the soap oil obtained in the neutralisation step is subjected to an intermediate heat treatment step for releasing gases dissolved in and bound to the soap oil. The neutralisation step is carried out with an acidly reacting substance, such as carbon dioxide, bisulphite, sulphur dioxide or carboxylic acid or a mixture of these.

In the present invention, raw tall oil or a similar wood oil product is treated with a low molecular weight carboxylic acid in order to esterify a significant portion of the components containing alcoholic groups, such as sterols, present in the wood oil to form lower organic esters thereof and thereby to prevent a reaction between the alcohols and the acid components of the tall oil. Whereas the acid treatment of EP 1 037 958 is carried out on a soap, i.e. an aqueous emulsion containing the saponified components of spent liquor, the present acid treatment is performed on wood oil which comprises a hydrophobic organic phase, typically obtained by acidification of a soap and by recovery of the non-aqueous phase. In EP 1 037 958 carboxylic acids have not, in practice, been used and it is unlikely that any esterification would take place at the conditions of the neutralisation, because a lower carboxylic acid would primarily dissolve in the aqueous phase of the soap.

According to the present invention, the wood oil subjected to the esterification is essentially non-aqueous which means that it contains less than about 20%, preferably less than about 10%, in particular less than about 5% by weight of water.

Particularly interesting esterifying acids are formic acid and/or acetic acid. The use of formic acid is preferred. The reason is that, in connection with the present invention, it has unexpectedly been found that formic acid reacts approximately 100 times faster than acetic acid. The dissociation of formic acid is 10 times stronger than that of acetic acid, which at least partly explains the speed difference. However, the esterification of the acetic acid by the sterols and also by the fatty alcohols is substantially faster than that of the fatty acids, in which case also acetic acid (as for instance propionic acid, too) can be used as a protective esterification agent.

Typically, in the present invention, formic acid, the quantity of which is for example approximately 1-3% of quantity of the wood oil, e.g. tall oil, is mixed with crude wood oil obtained from neutralization of crude soap derived from spent cooking liquor. Part of the acid used for neutralization of the crude soap can be used in the following step for catalyzing esterification.

According to one embodiment, it is possible to carry out the invention in such a way that a small part of the neutralization acid, which can be for instance waste acid or sulphuric acid, is replaced by formic acid or a corresponding small molecular alkane acid once the wood oil has been separated from the aqueous phase.

It is possible to use the formic acid as an azeotropic aqueous solution which comprises formic acid approximately 85% by weight.

It is preferred to introduce as little water as possible into the esterification mixture. Typically, the water content of the mixture should be kept below 20% by weight, in particular below 10% and preferably below about 5%.

Generally, the present invention is applied during an early stage of separation of the wood oil before any significant esterification has taken place between the components of the wood oil, e.g. between the sterols and the fatty acids.

It is possible to carry out the addition in association with the receiving of the raw material at the wood oil processing plant and/or at the storage of the raw material in the tall oil refinery.

The protective esterification according to the invention is preferably carried out at a temperature of approximately 30-150° C., most suitably approximately 50-140° C.

According to the present invention, by using the protective esterification, the low molecular weight of the fatty acids is maintained, and in the distillation process, the yield of the fatty acids increases by as much as several percentage points. At the same time, the fatty acids, which remain in the pitch fraction and which conventionally are esterified with the sterols, are replaced by low molecular weight formic acid, in which case the percentage of the sterols in the pitch increases by as much as 80%. Naturally, the absolute level of the sterols remains the same. This also means that the capacity of the sterol plant increases substantially, because the quantity of impurities in the sterols processed in the plant is reduced to approximately half. The focus of the present invention is the tall oil or other corresponding plant-based fatty-resin combinations that are generated from wood in association with pulping.

A typical molecular weight of a sterol is 415 and, correspondingly, of a typical fatty acid, for instance linolenic acid, is 278, and when these are esterified, a compound is generated which has a molecular weight of 693 and which is almost impossible to distil and which, consequently, remains in the pitch fraction of the distillation process. There is generally a price ratio of 1:2 between the pitch and the corresponding fatty acid, and, consequently, the improvement in the yield of fatty acid makes it much more economical to produce. The price ratio between sterol and pitch is much higher still.

A product which has been given a protective esterification by a low molecular weight organic acid is easy to restore to its initial form by using alkaline treatment and decantation in the aqueous stage.

Thus, according to an embodiment, the protective esterifying group(s) is(are) removed before further processing by alkaline treatment. The alkaline treatment is typically carried out with an alkali metal hydroxide, such as sodium hydroxide, or earth alkaline metal hydroxide, such as calcium hydroxide, potentially used in the form of an aqueous solution or dispersion.

The formate or acetate salt, e.g. Na or Ca formate or acetate, which is generated in the alkaline treatment, is usable as for instance a de-icing salt of roads in winter. Ca formate is also used in pig houses as a source of Ca and a stomach pH stabilizer for piglets.

EXAMPLE

In our tests, esterification of formic acid and stearyl alcohol took place in only minutes and when sulphuric acid is used, in about an hour. The tests were carried out at temperatures of 65-75° C. Compare this with the esterification of linolenic acic and stearyl acid, a process which lasted approximately 2 weeks producing a yield of 63%. It was surprising to find that formic acid in particular acts so fast in the process of esterification compared, for instance, with sulphuric acid.

Figure 1:
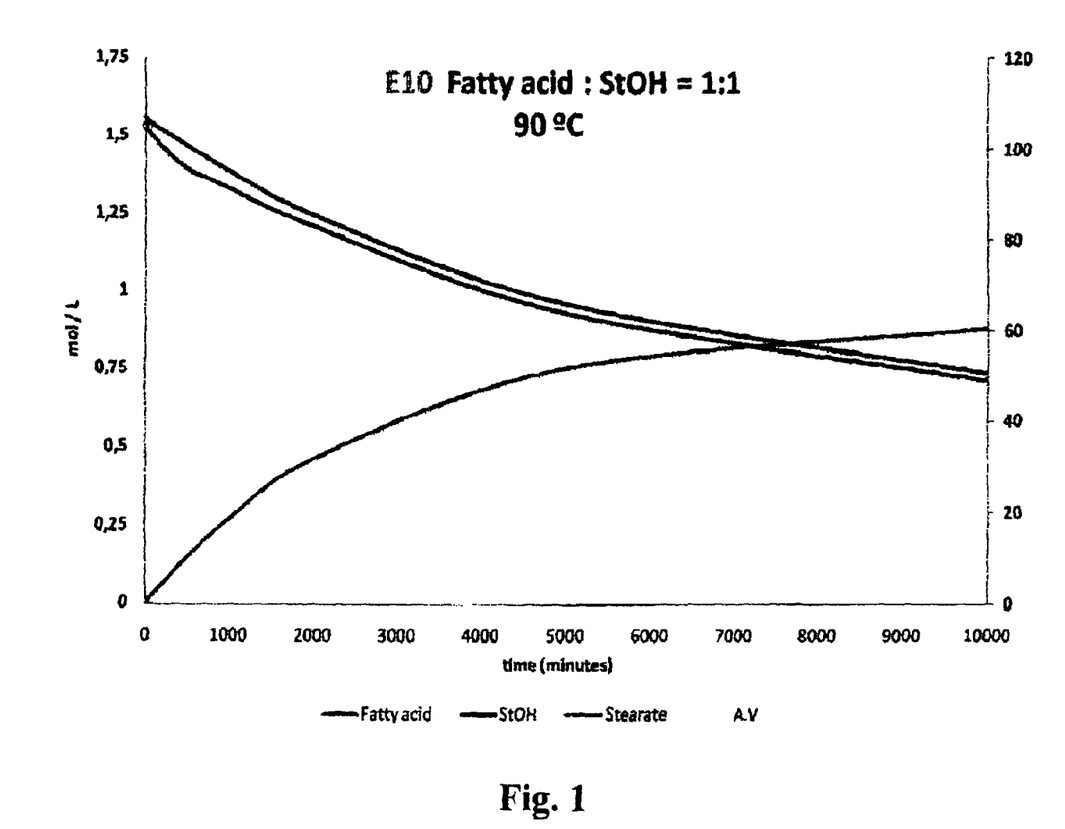
FIG. 1 shows the esterification of linolenic acid and stearyl alcohol, the molar ratio being 1:1 and the temperature 90° C.
Figure 2:
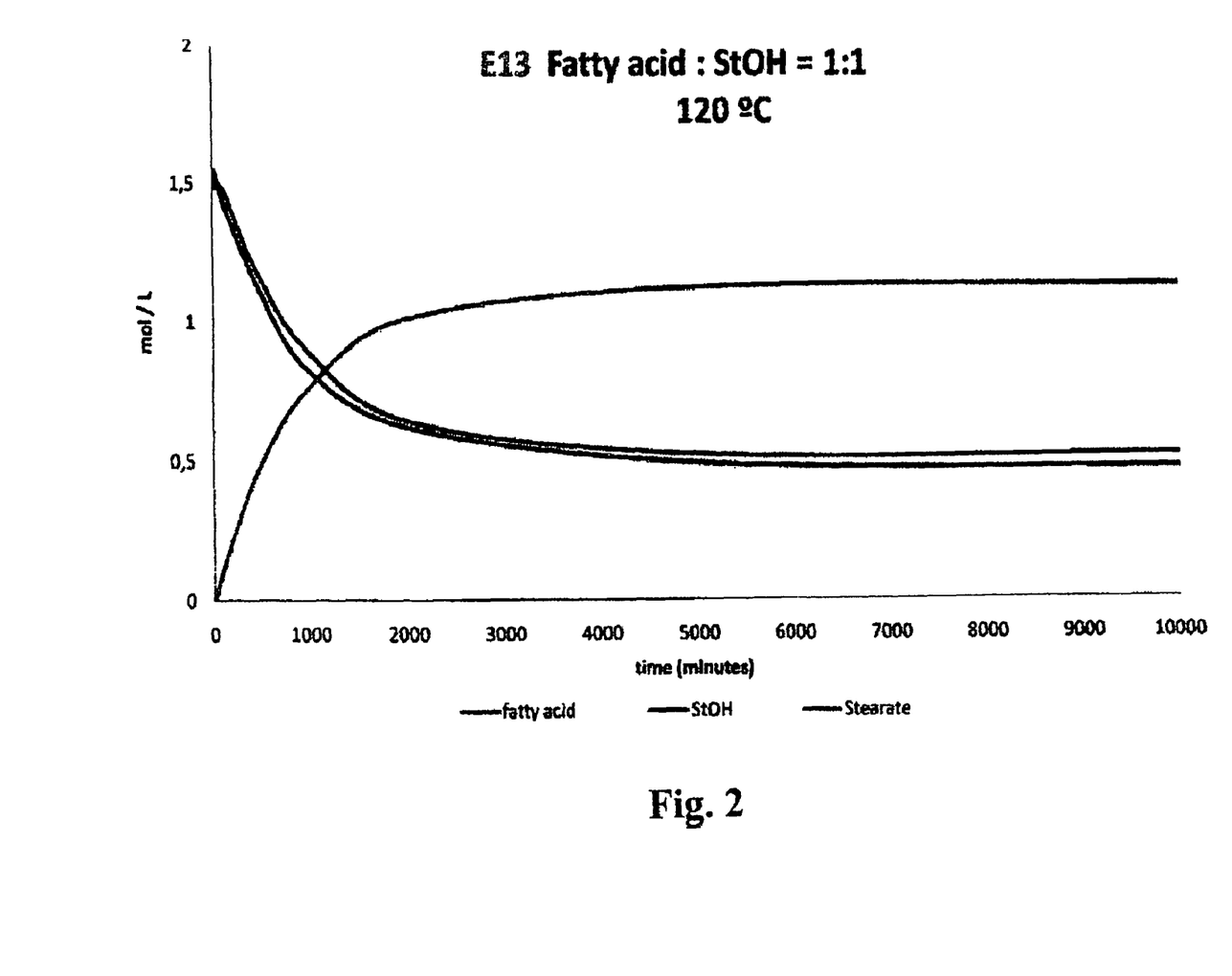
FIG. 2 shows the phenomenon of the corresponding reaction at a temperature of 120° C.

These facts are shown in FIGS. 1 and 2. FIG. 1 shows the esterification of linolenic acid and stearyl alcohol at a molar ratio of 1:1 and at a temperature of 90° C., and FIG. 2 shows the phenomenon of the corresponding reaction at a temperature of 120° C. As the figures show, the reaction is rather fast already at the temperature of 120° C., and after approximately 2 000 minutes an equilibrium is almost reached. By contrast, at a temperature of 90° C., an equilibrium has not yet been reached after 10 000 minutes.

Figure 3A:
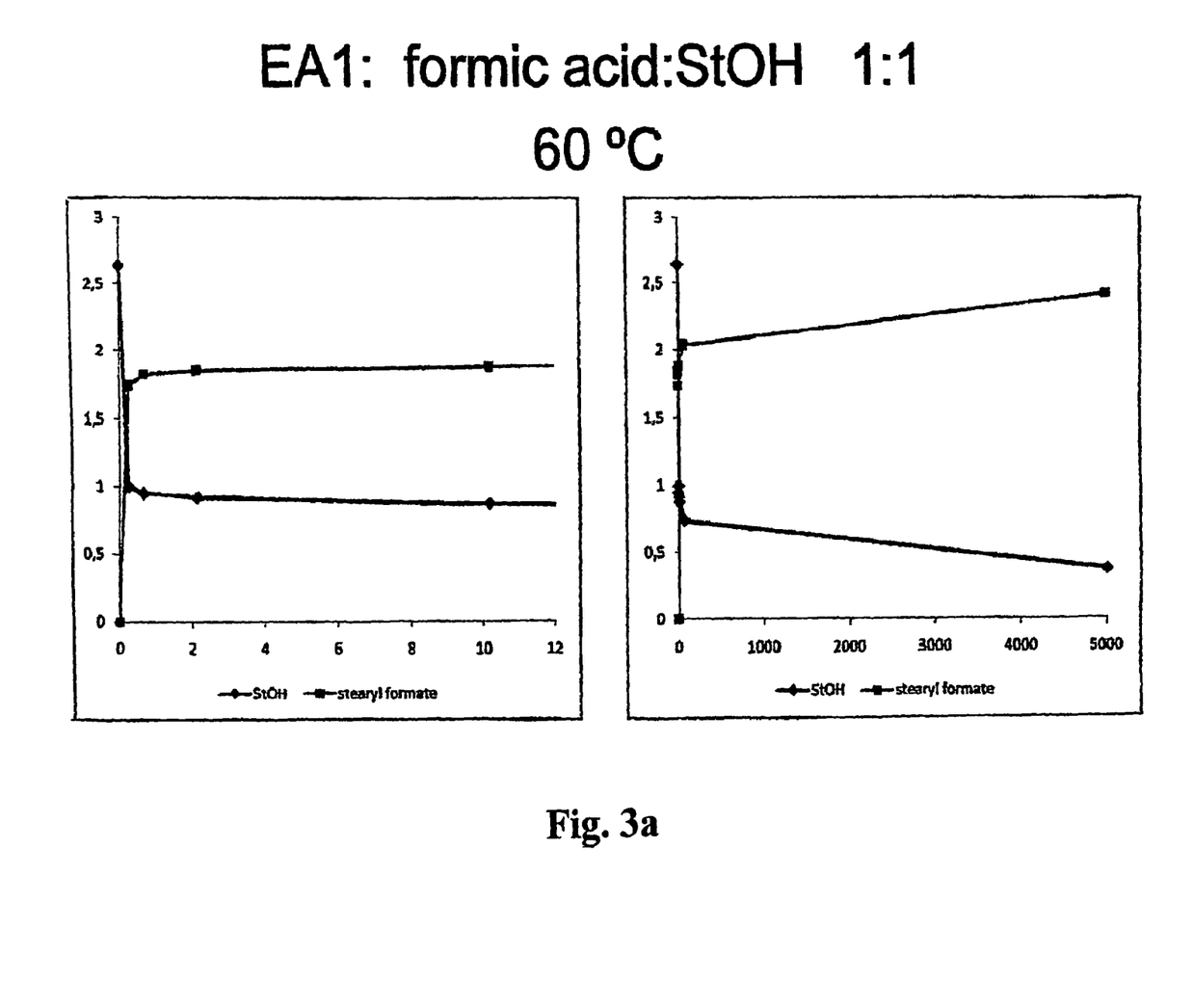
FIGS. 3a and 3b show the esterification of formic acid and stearyl alcohol, the molar ratio being 1:1 and the temperature 60° C.
Figure 3B:
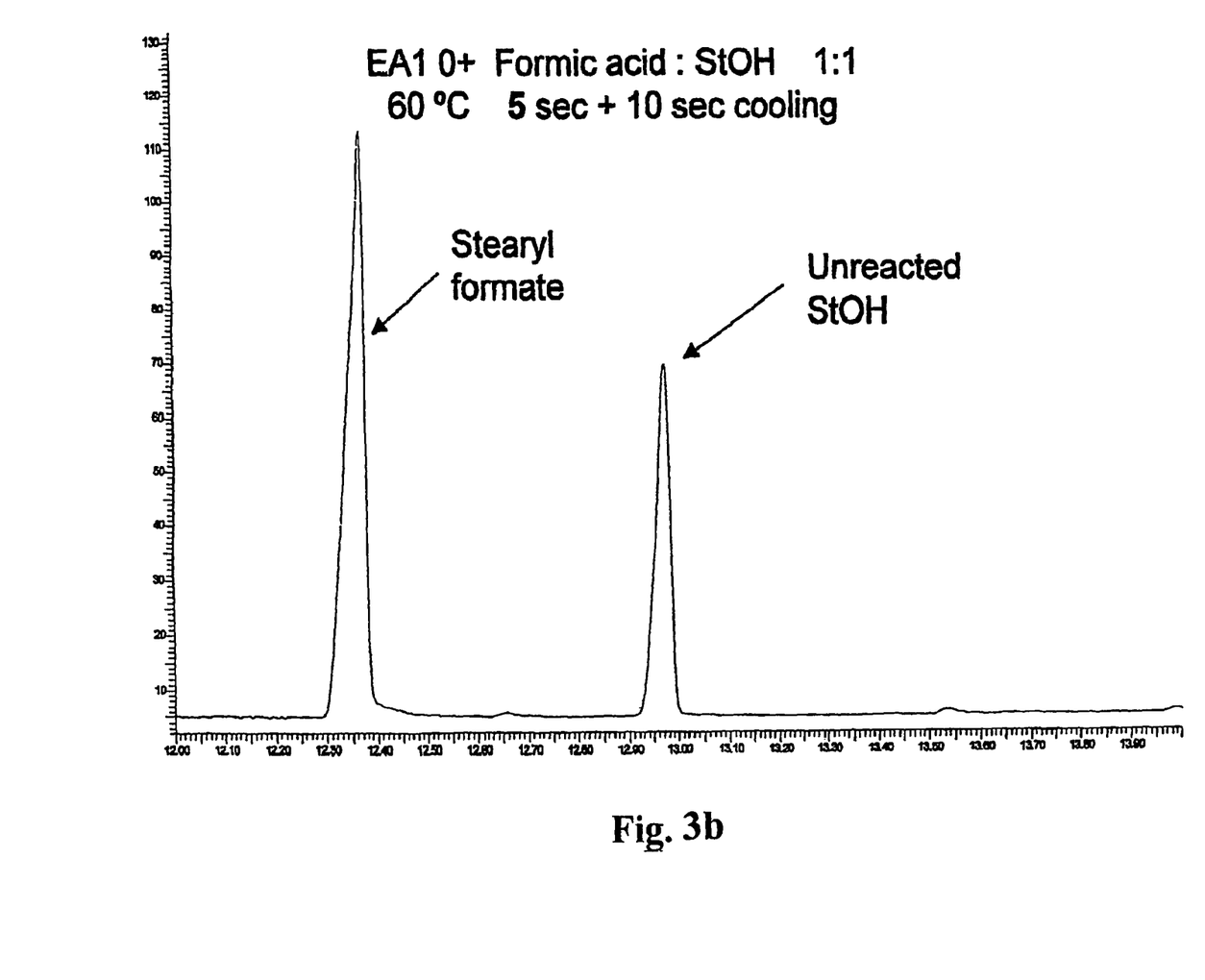

FIGS. 3a and 3b show, for comparison, the reaction between formic acid and stearyl alcohol at a molar ratio of 1:1 and at a temperature of 60° C. As can be seen, the reaction took place in seconds.

Figure 4:
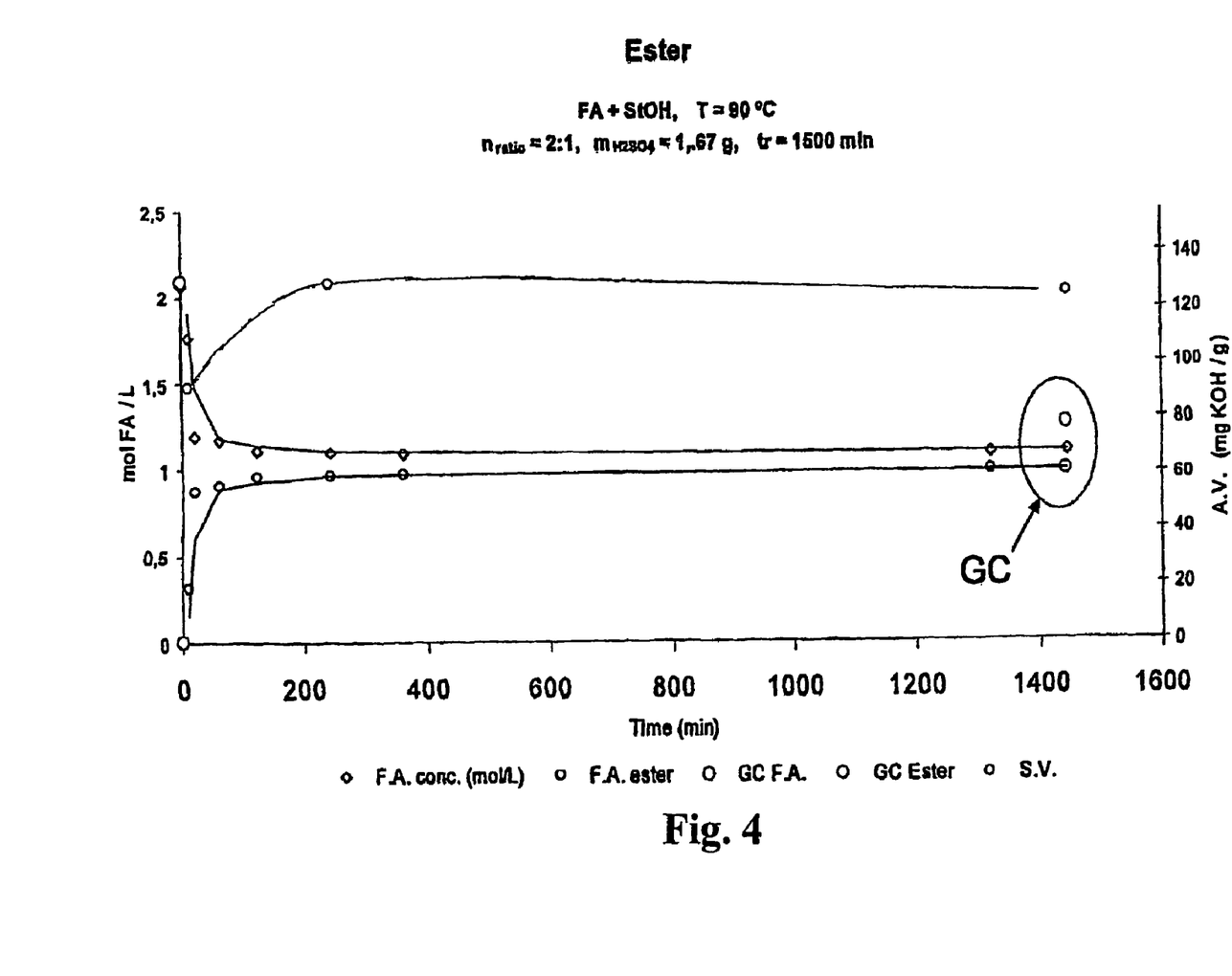
FIG. 4 shows the propagation of the esterification process of fatty acid, catalyzed by sulphuric acid, at a temperature of 90° C., the concentrations being determined by gas chromatography.

FIG. 4 shows the corresponding reaction catalyzed using sulphuric acid at a temperature of 90° C. The figure shows that the reaction has reached an equilibrium after approximately one hour.

Figure 5:
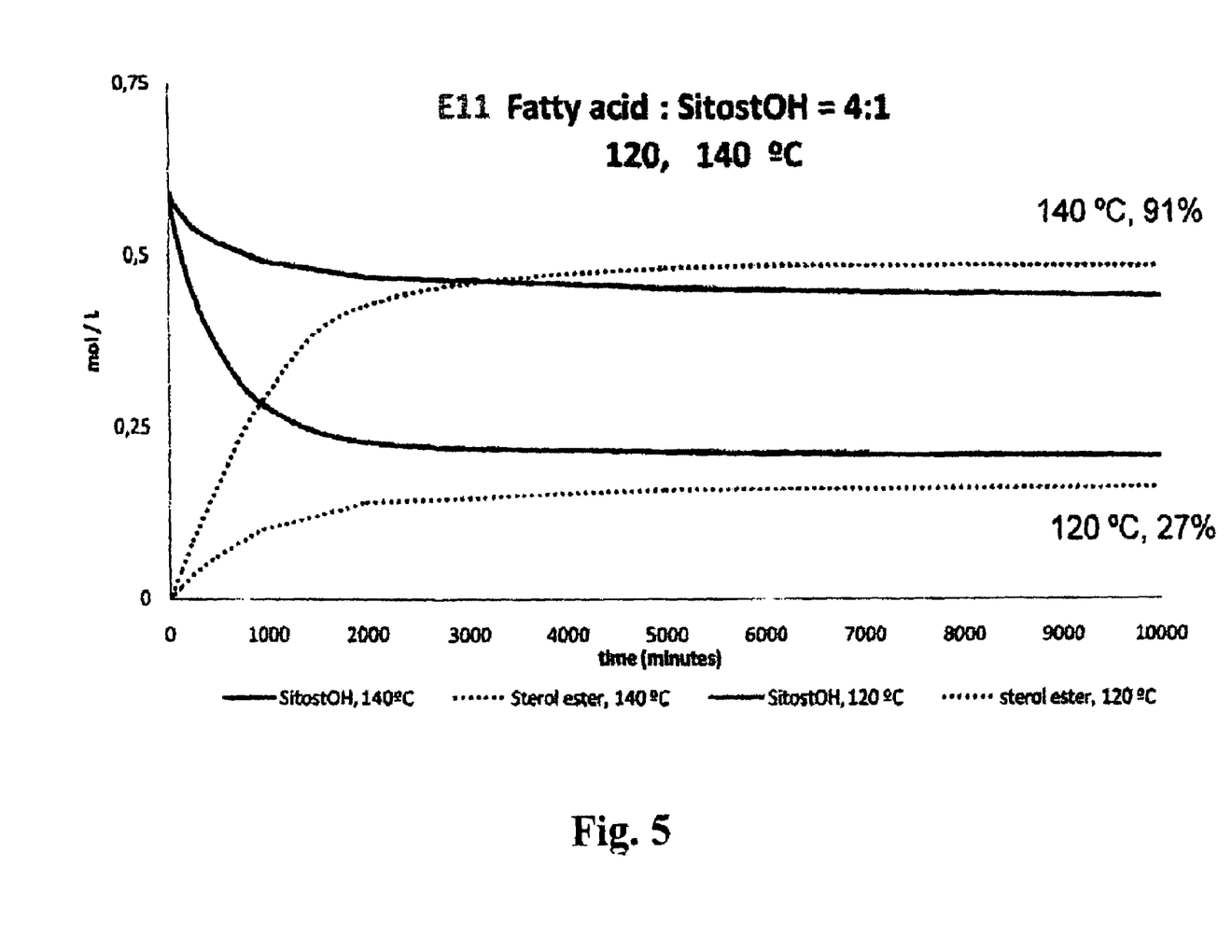
FIG. 5 shows the reactions of linolenic acid and sitosterol at two different temperatures.

FIG. 5 shows the reaction between fatty acid and sitosterol at a temperature of 120° C. and, correspondingly, at a temperature of 140° C., at which temperatures the reaction begins to reach an equilibrium after 2 000 minutes/120° C.

Figure 6A:
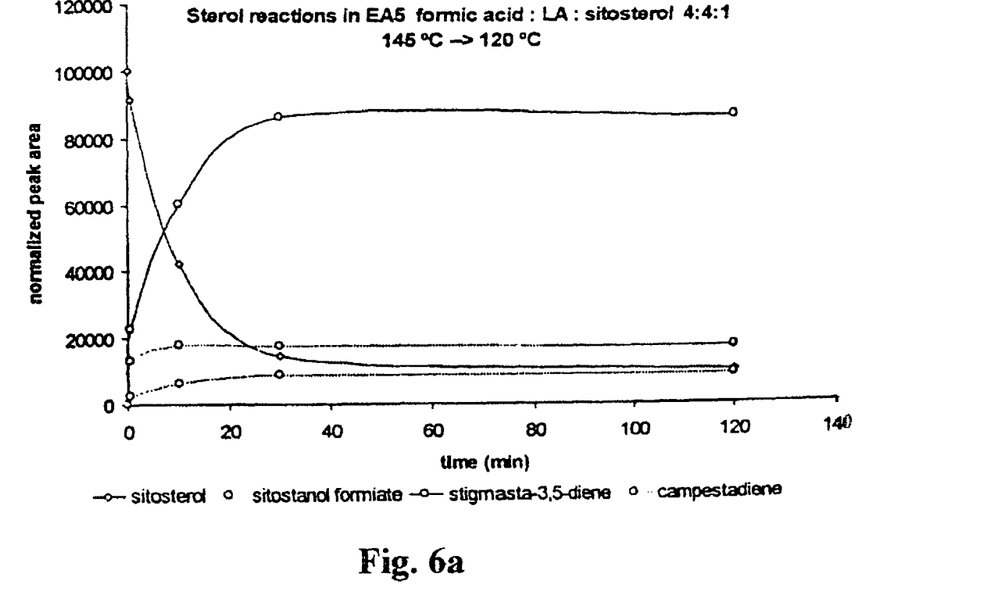
FIGS. 6a and 6b show the esterification of sterol with formic acid and the ratio of fatty acids to sterol (expressed by acid value) as a function of time.
Figure 6B:
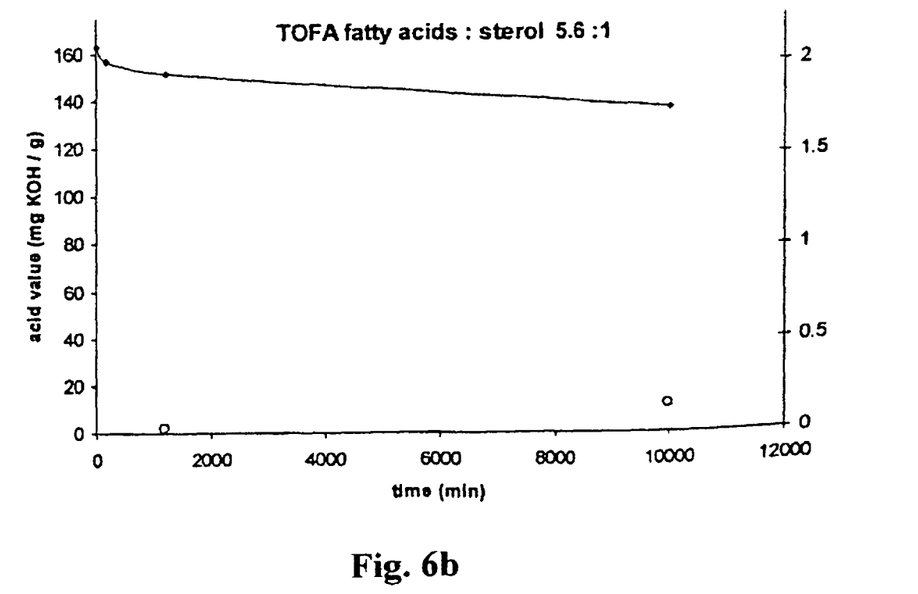

FIGS. 6a and 6b show sterol reactions and the ratio of fatty acids to sterols as a function of time.

Based on the test results above, it can be concluded that when formic acid is used for protective esterification, the formation of the ester is very fast compared with a reaction, which is catalyzed with sulphuric acid. The quantity of sulphuric acid is typically the same quantity which is used in splitting, i.e. 170-180 kg/tonne tall oil).

The invention claimed is:

1. A method of processing wood oil, which contains fatty acids, sterols and compounds with alcohol groups, for improving the yield of fatty acids and facilitating further processing of sterols, said wood oil being generated during pulping of a fibrous raw material, comprising
adding to the wood oil a low molecular weight carboxyl acid in an amount of approximately 0.5-5.0% of the wood oil quantity (weight) in order to esterify, by using said acid, at least a part of the alcohol groups which are present in the wood oil and in order essentially to prevent esterification of said alcohol groups by the fatty acids naturally contained in the wood oil,
and wherein the wood oil is obtained from the black liquor of the pulping, said carboxylic acid being added immediately after separation of wood oil from crude soap, before a significant portion of the alcohol groups have become esterified by the fatty acids naturally contained in the wood oil.

2. The method according to claim 1, wherein the carboxylic acid is a lower alkane acid.

3. The method according to claim 1, wherein the addition of the carboxylic acid is carried out at a wood oil processing mill, when the wood oil is received at the mill or during storage of the wood oil at the mill.

4. The method according to claim 1, wherein the protective esterification is carried out at a temperature of 25 to 150° C.

5. The method according to claim 1, wherein the protective esterifying group is removed before further processing by alkaline treatment.

6. The method according to claim 5, wherein the alkaline treatment is carried out with an alkali metal hydroxide or earth alkaline metal hydroxide.

7. The method according to claim 1, wherein the wood oil is crude tall oil.

8. The method according to claim 2, wherein the carboxylic acid is formic acid or acetic acid.

9. The method according to claim 4, wherein the protective esterification is carried out at a temperature of 40 to 140° C.

10. The method according to claim 6, wherein the alkaline treatment is carried out with sodium hydroxide or calcium hydroxide.

11. The method according to claim 5, wherein the alkaline treatment is carried out with an alkali metal hydroxide or earth alkaline metal hydroxide in the form of an aqueous solution or dispersion.

12. A method of processing a fibrous raw material comprising:
pulping the fibrous raw material to produce black liquor,
deriving crude soap from the black liquor,
separating wood oil containing fatty acids, sterols and compounds with alcohol groups from the crude soap, and
immediately after separating the wood oil from the crude soap, before a significant portion of the alcohol groups have become esterified by the fatty acids naturally contained in the wood oil, adding to the wood oil a low molecular weight carboxyl acid in an amount of approximately 0.5-5.0% of the wood oil quantity (weight) in order to esterify, by using said carboxylic acid, at least a part of the alcohol groups which are present in the wood oil and in order essentially to prevent esterification of said alcohol groups by the fatty acids naturally contained in the wood oil.

13. The method according to claim 12, wherein the carboxylic acid is a lower alkane acid.

14. The method according to claim 13, wherein the carboxylic acid is formic acid.

15. The method according to claim 12, wherein the addition of the carboxylic acid is carried out at a wood oil processing mill, when the wood oil is received at the mill or during storage of the wood oil at the mill.

16. The method according to claim 12, wherein the protective esterification is carried out at a temperature of 25 to 150° C.

17. The method according to claim 12, wherein the protective esterifying group is removed before further processing by alkaline treatment.

18. The method according to claim 17, wherein the alkaline treatment is carried out with an alkali metal hydroxide or earth alkaline metal hydroxide.

19. A method according to claim 12, wherein the wood oil is crude tall oil.

* * * * *